(12) United States Patent
Tazaki

(10) Patent No.: US 6,964,806 B1
(45) Date of Patent: Nov. 15, 2005

(54) MOLDINGS HAVING INK LAYER

(75) Inventor: Satoshi Tazaki, Kawasaki (JP)

(73) Assignee: Zeon Corporation, Tokyo (JP)

( * ) Notice: Subject to any disclaimer, the term of this patent is extended or adjusted under 35 U.S.C. 154(b) by 146 days.

(21) Appl. No.: 10/030,134

(22) PCT Filed: Jul. 31, 2000

(86) PCT No.: PCT/JP00/05138

§ 371 (c)(1),
(2), (4) Date: Jan. 25, 2002

(87) PCT Pub. No.: WO01/09228

PCT Pub. Date: Feb. 8, 2001

(30) Foreign Application Priority Data

Jul. 29, 1999 (JP) ................................ 11/214974

(51) Int. Cl.[7] .............................................. B32B 23/02
(52) U.S. Cl. .............................. 428/195.1; 428/411.1; 428/1.1; 264/379; 361/600; 106/31.13
(58) Field of Search ............................ 428/1.1, 411.1, 428/195.1; 264/379; 106/31.13; 361/600

(56) References Cited

U.S. PATENT DOCUMENTS

| | | | | |
|---|---|---|---|---|
| 5,003,019 A | * | 3/1991 | Ishimaru et al. | 526/281 |
| 5,223,315 A | * | 6/1993 | Katsura et al. | 428/36.92 |
| 5,360,688 A | * | 11/1994 | von Treba et al. | 430/22 |
| 5,437,926 A | * | 8/1995 | Takahashi et al. | 428/332 |
| 5,508,068 A | * | 4/1996 | Nakano | 427/553 |
| 5,516,456 A | * | 5/1996 | Shinohara et al. | 252/299.01 |
| 6,024,455 A | * | 2/2000 | O'Neill et al. | 359/530 |
| 6,069,196 A | * | 5/2000 | Akao et al. | 524/424 |
| 6,077,879 A | * | 6/2000 | Ohtsuki et al. | 522/101 |
| 6,235,358 B1 | * | 5/2001 | Goto et al. | 428/35.7 |

FOREIGN PATENT DOCUMENTS

| | | |
|---|---|---|
| JP | 51-59989 | 5/1976 |
| JP | 63-043910 | 2/1988 |
| JP | 64-001706 | 1/1989 |
| JP | 64-066216 | 3/1989 |
| JP | 03-014882 | 1/1991 |
| JP | 03-122137 | 5/1991 |
| JP | 04-122639 | 4/1992 |
| JP | 04-361230 | 12/1992 |
| JP | 04-372901 | 12/1992 |
| JP | 05-002108 | 1/1993 |
| JP | 05-025424 | 2/1993 |
| JP | 06-136057 | 5/1994 |
| JP | 07-258318 | 10/1995 |
| JP | 05-005841 | 1/1996 |

(Continued)

Primary Examiner—Rena Dye
Assistant Examiner—Tamra L. Dicus
(74) Attorney, Agent, or Firm—Armstrong, Kratz, Quintos, Hanson & Brooks, LLP

(57) ABSTRACT

A molding having an ink layer, wherein the molding is formed from an alicyclic structure-containing polymer, the ink layer is provided after a pattern on the surface of the molding, and the retention of the ink layer when a 1-cm$^2$ portion arbitrarily selected from the surface of the molding containing the patterned ink layer is subjected to a tape peeling adhesion test is at least 80%. A molding having an ink layer, wherein the molding is formed from an alicyclic structure-containing polymer, and the ink layer is provided after a pattern on the surface of the molding and has an index of wetting of at most 42 dyn/cm.

12 Claims, 1 Drawing Sheet

FOREIGN PATENT DOCUMENTS

| | | |
|---|---|---|
| JP | 08-012787 | 1/1996 |
| JP | 08-094852 | 4/1996 |
| JP | 08-201618 | 8/1996 |
| JP | 08-302046 | 11/1996 |

* cited by examiner

MOLDINGS HAVING INK LAYER

TECHNICAL FIELD

The present invention relates to a molding having an ink layer, and particularly to a molding with an ink layer excellent in adhesion and durability provided after a pattern on the surface of a molding formed from an alicyclic structure-containing polymer. Typical examples of the molding according to the present invention include light guides for back light in liquid crystal display devices, various container, etc.

In the present invention, the pattern means patterns of a wide variety of forms including dots, lines, figures, characters, graduation marks and combinations thereof. The pattern includes a pattern of a definite form, a pattern of a complex form, a character pattern and combinations thereof. Further, the color tone of the pattern may be a single color, a multicolor or a full color.

BACKGROUND ART

Alicyclic structure-containing polymers such as norbornene polymers are polymers excellent in transparency, heat resistance, low water absorption property, chemical resistance, etc. and are hence used in a wide variety of fields as optical materials for lenses, optical disk substrates and the like; materials for medical equipments such as syringes, drug containers, bags for infusion and bags for transfusion; and food packaging materials such as food packaging bottles and food packaging films.

Although a molding formed from an alicyclic structure-containing polymer exhibits excellent various properties, it has involved a problem that when a pattern such as characters, graduation marks, figures and/or the like is printed with a printing ink on the surface thereof, the resultant ink layer is easy to separate. The ink layer is easy to undergo interfacial separation from the surface of the molding under severe environment such as high temperature and high humidity in particular. Uses of moldings formed from the alicyclic structure-containing polymer have hence been limited.

For example, uses relevant to optical materials for the alicyclic structure-containing polymers include a field of liquid crystal display devices (LCD). It has heretofore been proposed to use them as phase plates, surface protecting films, etc (Japanese Patent Application Laid-Open Nos. 4-361230 and 5-2108). As the phase plates and the surface protecting films, stretched films or unstretched films of the alicyclic structure-containing polymer may be used as they are. On the other hand, in order to use the alicyclic structure-containing polymer as a light guide for back light in LCD, it is necessary to provide a reflecting layer on the back surface of a transparent light guide formed from the alicyclic structure-containing polymer.

As the back light in LCD, is known, for example, an edge type back light. FIG. 1 is a sectional view illustrating an exemplary edge type back light. A reflecting layer 2 for irregularly reflecting light is provided on the back surface of a transparent light guide 1, and light from a light source 4 (for example, a cold cathode tube) arranged on a side surface of the light guide 1 is irregularly reflected or scattered by the reflecting layer and gathered on the side of a liquid crystal display panel (provided at an upper position in the drawing). A diffusing plate 3 is arranged on the surface of the light guide 1 on the side of the liquid crystal display panel, as needed, and a converging plate (not illustrated) may be further arranged thereon in some cases. A reflecting plate may be arranged below the reflecting layer as needed. Such an edge type back light may be made thin and/or large size.

As a means for providing a reflecting layer by a simple treatment, there has heretofore been known, for example, a process in which a form such as a dot pattern is screen-printed with a printing ink incorporating an inorganic filler, a white pigment and the like on the surface of a light guide formed from a transparent acrylic plate to provide a reflection pattern. A printing ink composed mainly of a liquid with white lacquer diluted with a large amount of lacquer thinner is used as the ink.

When the reflection pattern is formed with the printing ink for the purpose of using it as a light guide, however, it is difficult to sufficiently exhibit the performance, since a molding formed from the alicyclic structure-containing polymer is generally poor in adhesion to the ink layer. In addition, with the production of a large- and thin-sized LCD and the formation of high-quality picture images in recent years, the back light is required to have higher optical properties such as high-intensity luminance and low luminance mottling than before. Besides, the use environment of the back light becomes severer because LCD comes to be used as displays for notebook type computers and car navigations.

Therefore, the printed ink layer of the light guide is forward to form a minute pattern and a complexly shaped pattern and required to cause neither lowering of luminance nor increase of luminance mottling due to interfacial separation of the patterned ink layer and to undergo none of color fading, wrinkling, blistering and the like even when it is left to stand over a long period of time of at least 500 hours under high-temperature and high-humidity environment (for example, under environment of a temperature of 60° C. and a humidity of 90%).

It has been an extremely difficult problem to apply a molding having a patterned ink layer and made of an alicyclic structure-containing polymer to fields of which such high durability is required.

Japanese Patent Application Laid-Open No. 8-5841 has proposed an edge type back light device for liquid crystal making use of a transparent amorphous polyolefin resin plate having a heat distortion temperature of at least 120° C. as a light guide. In this publication, it is described that a dot pattern is formed with a printing ink composed mainly of such a diluted liquid as described above. However, the publication does not describe the details of the printing ink. In addition, Examples of the publication show the results of luminance measurement of back light devices conducted under the same conditions as in real devices. However, this measurement is nothing but a property test under environment as relatively mild as a temperature of 23.7° C. and a humidity of 66% and does not teach the fact that neither lowering of luminance nor increase of luminance mottling is caused even when the back light devices is left to stand over a long period of time under high-temperature and high-humidity environment.

If a pattern such as characters, graduation marks, figures or combinations thereof can be formed with a printing ink not only on the surface of the optical materials such as light guides, but also on the surface of containers such as bottles and bags formed from an alicyclic structure-containing polymer, thereby obtaining an ink layer having excellent adhesion and durability, the development of new uses can be devised.

Japanese Patent Application Laid-Open No. 5-25424 discloses that a coating containing a copolymer composed of a repeating unit derived from a polycyclic (meth)acrylate, a repeating unit derived from an ethylenically unsaturated monomer having a reactive functional group and a repeating unit derived from an ethylenically unsaturated monomer having no reactive functional group is used, whereby a coating film excellent in adhesion can be formed on a molding containing a cycloolefin random copolymer. The Example of this publication shows that the adhesion of the coating film was good when a moisture resistance test that a sample is left to stand for 240 hours under environment of a temperature of 50° C. and a relative humidity of 90% was conducted. However, the coating described in the publication is evenly applied to the surface of the molding to protect the molding and is not a printing ink having good printability.

Japanese Patent Application Laid-Open No. 4-122639 describes that a resin coating is applied to a molding formed from a hydrogenated norbornene resin, thereby improving surface appearance, weather resistance and resistance to damage. However, the resin coating described in the publication is evenly applied to the surface of the molding and is not a printing ink having good printability.

DISCLOSURE OF THE INVENTION

It is an object of the present invention to provide a molding formed from an alicyclic structure-containing polymer and provided with a patterned ink layer on the surface thereof, wherein the molding is excellent in adhesion to the ink layer and hard to cause interfacial separation, deformation, discoloration, etc. of the ink layer even when it is left to stand for a long period of time under high-temperature and high-humidity environment.

More specifically, the object of the present invention is to provide a molding formed from an alicyclic structure-containing polymer and provided with a patterned ink layer on the surface thereof, wherein in a long-time high-temperature and high-humidity test, the patterned ink layer (1) undergoes none of appearance defects such as color fading, wrinkling and blistering and (2) causes no deterioration of optical properties (for example, light reflectance) due to penetration of air and water into the interface by separation of the patterned ink layer.

The present inventors have carried out an extensive investigation with a view toward solving the above-described problems. As a result, it has been found that when in a molding formed from an alicyclic structure-containing polymer, on the surface of which an ink layer has been formed after a pattern with a printing ink, the retention of the ink layer in a peeling adhesion test on a fixed area is high, the ink layer causes none of interfacial separation, deformation, discoloration, etc in a long-time high-temperature and high-humidity test.

The present inventors have also found that when the patterned ink layer formed on the surface of the molding has a light-reflecting function, the lowering of luminance and increase of luminance mottling in the long-time high-temperature and high-humidity test are inhibited.

In order to provide such a patterned ink layer excellent in adhesion and durability on the surface of the molding formed from the alicyclic structure-containing polymer, it is effective to use a printing ink capable of forming an ink layer having an index of wetting not higher than a certain value. As such a printing ink, an ink containing a polymer component such as an olefin resin, acrylic resin, urethane resin, epoxy resin or cyclized rubber as a vehicle is suitable.

The present invention has been led to completion on the basis of these findings.

According to the present invention, there is thus provided a molding having an ink layer, wherein the molding is formed from an alicyclic structure-containing polymer, the ink layer is provided after a pattern on the surface of the molding, and the retention of the ink layer when a 1-cm$^2$ portion arbitrarily selected from the surface of the molding containing the patterned ink layer is subjected to a tape peeling adhesion test is at least 80%.

According to the present invention, there is also provided a molding having an ink layer, wherein the molding is formed from an alicyclic structure-containing polymer, and the ink layer is provided after a pattern on the surface of the molding and has an index of wetting of at most 42 dyn/cm.

BEST MODE FOR CARRYING OUT THE INVENTION

Figure 1:
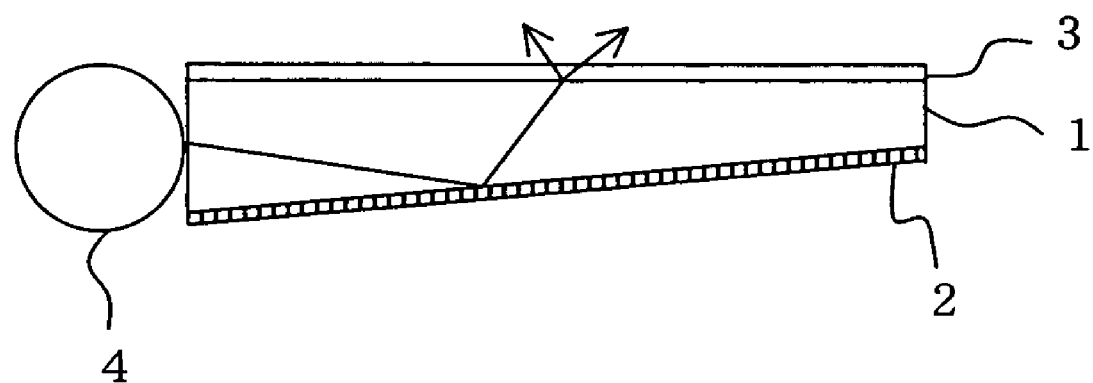
FIG. 1 is a sectional view illustrating an exemplary edge type back light.

The molding according to the present invention is that provided with a patterned ink layer with a printing ink on the surface of a molding obtained by molding an alicyclic structure-containing polymer. The adhesion of the ink layer can be evaluated by a tape peeling adhesion test. Specifically, the molding having the ink layer according to the present invention requires that the retention of the ink layer when a 1-cm$^2$ portion arbitrarily selected from the surface of the molding containing the patterned ink layer is subjected to the tape peeling adhesion test indicates at least 80%.

The retention of the ink layer is a value obtained by arbitrarily selecting a 1-cm$^2$ portion from the surface of the molding containing the patterned ink layer and subjecting the 1-cm$^2$ portion to a tape peeling adhesion test and calculated out as a proportion of the area of the ink layer remaining without being separated after the tape peeling adhesion test to the area of the ink layer within a range of the selected 1-cm$^2$ portion before the tape peeling adhesion test. When the pattern is a fine dot pattern, and the form of dots is almost the same within a range of 1 cm$^2$, a proportion of dots remaining in the dot pattern after the tape peeling adhesion test may be regarded as the retention.

The tape peeling adhesion test is conducted by using the same pressure sensitive adhesive tape as that used in the cross-cut adhesion test prescribed in JIS K 5400 and peeling the pressure sensitive adhesive tape in exactly the same manner as in the cross-cut adhesion test except that cuts of a grid pattern are not formed in the area of 1 cm$^2$.

The retention of the ink layer after the tape peeling adhesion test must be at least 80% and is preferably at least 90%, more preferably at least 95%, most preferably 100%. If this retention is too low, the adhesion of the ink layer becomes poor, and moreover the ink layer is easy to undergo interfacial separation, deformation, discoloration and/or the like when such a molding is left to stand for a long period of time under high-temperature and high-humidity environment, and so the durability thereof becomes poor. When the molding is a light guide for back light in a liquid crystal display device, and a reflection pattern is formed by an ink layer poor in adhesion, the lowing of luminance becomes marked, and luminance mottling also increases if it is left to stand for a long period of time under high-temperature and high-humidity environment.

In the present invention, the pattern means patterns of a wide variety of forms including dots, lines, figures, characters, graduation marks and combinations thereof. There is no limitation on the form and size of the pattern. However, an ink layer excellent in adhesion and durability may be formed even when it is in a minute form. In the light guide for back light, or the like in a liquid crystal display device, the reflecting layer is desirably formed after a fine pattern. Therefore, the pattern is preferably represented by dots and/or lines.

In the dots and lines formed by a printing ink, the size, form, color, etc. thereof are suitably selected as necessary for the end application intended. The diameter of the dot and the width of the line are generally of the order of from submicrons to several millimeters. When optical properties such as a light-reflecting function are imparted, at least several hundreds microns are preferred. When a figure or the like is represented as an aggregate of dots and lines, several microns or so are preferred. The forms of dots include polygons such as a square and a hexagon in addition to a circle. However, the circle is preferably used. The color of the dots and lines is preferably white or translucent when the light-reflecting function is imparted, preferably a primary color such as red, blue or yellow or black when graduation marks or the like are represented, or preferably a combination of several kinds of colors when a figure or the like is represented.

No particular limitation is imposed on the thickness of the ink layer, and the thickness is suitably selected as necessary for the end application intended. However, it is generally at most 100 μm, and preferably 1 to 50 μm, more preferably 2 to 30 μm when optical properties such as reflecting function are imparted, or when graduation marks or the like are represented. When the thickness of the ink layer falls within the above range, the adhesion, light-reflecting property, light-screening property, volatility of the printing ink, etc. are balanced with one another at a high level. It is hence preferred that the thickness be within the above range. When a figure or the like is represented, the thickness of the ink layer is preferably 0.1 to 50 μm, more preferably 0.5 to 30 μm. When the thickness of the ink layer falls within the above range, the adhesion, volatility, lightness, etc. are balanced with one another at a high level. It is hence preferred that the thickness be within the above range.

As described above, the pattern formed by dots and/or lines is used as, for example, numerals, characters such as alphabet and kanji (Chinese characters), graduation marks, etc. The pattern is also used as, for example, an ornamental figure for tableware and the like, an optical pattern (reflection pattern, black stripe, etc.) of optical parts, etc.

Specifically, when the molding is a light guide, the pattern is used as a reflection pattern formed on a surface (reflecting surface) opposite to an outgoing surface of light in the light guide for the purpose of reflecting a light beam from a light source in the direction (on the side facing LCD) of the outgoing surface of the light guide. The form and the like of the reflection pattern are not limited so far as it is a pattern capable of reflecting the light beam from the light source by even brightness. However, such a pattern composed of an aggregate of a plurality of dots that the density increases as it becomes more distant from the light source is preferred. The use of a white ink or translucent ink as the ink is preferred because the luminance and color temperature of a back light unit are improved.

Specific preferable examples of a circular dot pattern include (1) a pattern that a plurality of circular dots are arranged in the form of a grid on the reflecting surface of a light guide in such a manner that an interval between the central points of the respective dots is equal to each other, and (2) a pattern that a plurality of equi-sized circular dots are arranged on the reflecting surface of a light guide in such a manner that an interval therebetween becomes gradually close as it becomes more distant from the light source. The pattern (1) is more preferred from the viewpoints of printability, optical properties and the like.

The distance between the central points of the circular dots in the above-described pattern is generally 0.1 to 2 mm. In the case of the pattern (2), the distance becomes gradually small as it becomes more distant from the light source. The diameter of each dot is 0.1 to 2 mm. In the case of the pattern (1), the diameter becomes continuously gradually great as it becomes more distant from the light source.

When the molding is a lenticular lens or the like used in, for example, a screen of a wide-screen display, the pattern may be an aggregate of a plurality of black lines arranged at an equal interval, which has a function of imparting contrast.

In the present invention, no particular limitation is imposed on the printing ink capable of forming the patterned ink layer high in the retention in the tape peeling adhesion test. However, is preferred a printing ink by which the index of wetting of an ink layer formed on the surface of a molding formed from an alicyclic structure-containing polymer with the printing ink is at most 42 dyn/cm, preferably at most 40 dyn/cm, more preferably at most 38 dyn/cm as measured in accordance with the standard (JIS K 6768) related to the indexes of wetting of plastic films. The lower limit of the index of wetting of the ink layer is of the order of generally 25 dyn/cm, preferably 28 dyn/cm.

The index of wetting of the ink layer (may be referred to as "index of wetting of ink" in some cases) means a surface tension of a mixed liquid judged that a coating film is just wetted when a printing ink is evenly applied on the surface of a molding, and a series of mixed liquids, the surface tensions of which are different in due order, are successively applied on the surface of the resultant coating film.

No particular limitation is imposed on components making up the printing ink and a composition thereof, and any inks composed of a coloring material, a vehicle and auxiliaries like the general inks are used.

As the coloring material, may be used pigments such as organic pigment and inorganic pigments, carbon black, dyes, and the like. However, the pigments are preferably used from the viewpoints of light fastness, chemical resistance, etc., and inorganic pigments are more preferably used.

As the inorganic pigments, may be used oxides such as zinc white, titanium dioxide, red iron oxide, chromium oxide, cobalt blue and iron black; hydroxides such as alumina white and yellow iron oxide; sulfides and selenides such as zinc sulfide, cinnabar, cadmium yellow and cadmium red; ferrocyanides such as Prussian blue; chromates such as chrome yellow, zinc chromate and molybdenum red; sulfates such as precipitated barium sulfate; carbonates such as precipitated calcium carbonate; silicates such as hydrated silicate and ultramarine blue; phosphates such as manganese violet; and metallic powders such as aluminum powder, bronze powder and zinc dust.

As the organic pigments, may be used nitroso pigments; nitro pigments; azo pigments such as azo lake pigments and insoluble azo pigments; lake pigments such as acid dye lakes and basic dye lakes; phthalocyanine pigments; fused polycyclic pigments such as thren pigments, quinacridone pigments, dioxazine pigments and isoindolinone pigments.

The vehicle is a component having a function of fixing or immobilizing the coloring material on the surface of the molding and is generally composed of a polymer component, a fat or oil and a solvent. The vehicle may contain, as additional auxiliaries, a plasticizer, a dispersing agent, a antifoaming agent, a leveling agent, a viscosity modifier, a adhesion-imparting agent, an antistatic agent, a filler, etc. as needed. When the ink has curability by ultraviolet light, heat or the like, the vehicle may further contain a polymerizable monomer, a hardening agent, a reaction initiator, etc.

As the polymer component, may be sued resins and rubber components. Specific examples of the resins include olefin resins, acrylic resins, urethane resins, epoxy resins, polyester resins, melamine resins, vinyl resins, polyamide resins, polyimide resins and alkyd resins. The olefin resins, acrylic resins, urethane resins and epoxy resins are preferred from the viewpoints of adhesion, heat resistance, light fastness, etc., with the olefin resin being most preferred. These resins preferably contain a certain amount of a hydrophobic moiety (for example, a saturated hydrocarbon skeleton or the like) in a repeating unit of their polymers for the purpose of improving the adhesion to the alicyclic structure-containing polymer.

Examples of the olefin resin include linear olefin resins such as polyethylene and polypropylene; aromatic vinyl resins such as polystyrene; cycloolefin resins; and ethylene-vinyl acetate resins (EVA). These olefin resins are preferably modified with maleic acid or halogen in order to solubilize them in solvents.

Examples of the rubber components include cyclized rubber, polybutadiene rubber, silicone rubber and acrylic rubber. The cyclized rubber and polybutadiene rubber are preferred from the viewpoints of adhesion, heat resistance, light fastness, etc., with the cyclized rubber being most preferred.

The polymer components described above may be used either singly or in any combination thereof. However, it is most preferred to use a mixture of a linear polyolefin resin and EVA because the solubility in solvents and the adhesion to the molding become excellent.

The polymers described above may be cured by light or heat. When the polymer is curable, it is permissible that the polymer is present in the form of a curable monomer in the ink, and the monomer is cured by light or heat after coating of the ink to form an ink layer.

When a light-reflecting function or the like is imparted by placing the ink on the surface of the molding, an inorganic or organic fine filler may also be incorporated as a filler into the ink. No particular limitation is imposed on the kind of the filler used. However, a filler, the difference in refractive index with the polymer component of which is small, is preferred because light reflection efficiency is improved.

No limitation is imposed on the solvent so far as it can dissolve the polymer component therein, and organic solvents such as aliphatic hydrocarbon solvents, aromatic hydrocarbon solvents, ketone solvents, alcohol solvents, ether solvents and halogen-containing solvents may be used. The aliphatic hydrocarbon solvents, aromatic hydrocarbon solvents and ketone solvents are preferred from the viewpoint of the ability to dissolve the polymer component, volatility, etc. These solvents may be used either singly or in any combination thereof. From the reason that viscosity change upon printing can be lessened, it is desirable that a solvent having a boiling point of preferably at least 100° C., more preferably at least 110° C. be contained in a proportion of at least 50% by weight based on the total weight of the solvent component.

When the whole or a part of the polymer component is curable by light or heat, the solvent may not be always used because a curable monomer serves as a diluent in place of the solvent.

The solids concentration (content of the polymer component to the total weight of the ink) in the ink is generally 5 to 100% by weight, preferably 10 to 90% by weight, more preferably 20 to 80% by weight from the viewpoints of coating property, adhesion, volatility, etc. An aqueous solvent which does not dissolve the polymer component may be used as the solvent to use the ink as an emulsion ink. In order to adjust the color tone and color density of the resulting ink layer, at least two kinds of inks may be used as a mixture. In order to enhance the printability of the ink, a diluent solvent may be used to adjust the ink to the desired solids concentration.

As a method of forming a pattern, may be used a conventionally known printing method, and spray printing, roll coating, curtain coating or the like may also be used. As a method capable of forming a minuter pattern, a printing method such as screen printing, pad printing (a method of printing a pattern or the like by transferring an aggregate of dots; may also be referred to as dabber printing), label-embedding printing or ink-jet printing is preferably used. When characters or figures are printed as a pattern of a definite form to impart a light-reflecting function and the like, screen printing capable of forming the ink layer to a fixed thickness is preferred. A pattern of a colorful or complicated form such as a design is formed, pad printing or label-embedding printing capable of imparting color changes and easily forming a complicated shape and high in freedom of form is preferred.

Before printing with the printing ink, the molding may be subjected to a surface treatment such as corona discharge treatment, plasma treatment, surface-roughening treatment with a solvent or the like, or sandblasting treatment, or to a primer treatment for the purpose of improving the adhesion. However, it is preferable to subject the molding to the corona discharge treatment from the viewpoints of productivity and simplification.

After the desired pattern is printed with the printing ink on the surface of the molding, the solvent is generally removed to dry the molding, thereby forming an ink layer. When the ink is curable, a coating layer of the ink is exposed to ultraviolet light or electron beam or heated, thereby curing the coating layer to form an ink layer.

As the alicyclic structure-containing polymer making up the molding according to the present invention, may be used that having an alicyclic structure in a repeating unit of the polymer. No particular limitation is imposed on the alicyclic structure-containing polymer so far as it has an alicyclic structure in a main chain and/or a side chain thereof. However, that having the alicyclic structure in the main chain is preferred from the viewpoints of mechanical strength, heat resistance, moldability, etc. The alicyclic structure-containing polymer used in the present invention is preferably thermoplastic from the viewpoint of molding and processing ability.

Examples of the alicyclic structure include a cycloalkane structure, a cycloalkene structure and the like. The cycloalkane structure is preferred from the viewpoints of mechanical strength, heat resistance and the like. No particular limitation is imposed on the number of carbon atoms forming the alicyclic structure. However, it is within a range of generally from 4 to 30, preferably from 5 to 20, more preferably from 5 to 15, thereby balancing various properties such as mechanical strength, heat resistance and moldability with one another at a high level.

A proportion of the repeating unit having the alicyclic structure in the alicyclic structure-containing polymer may be suitably selected as necessary for the end application intended. However, it is generally at least 50% by weight, preferably at least 70% by weight, more preferably at least 90% by weight. If the proportion of the repeating unit having the alicyclic structure in the alicyclic structure-containing polymer is too low, the heat resistance of such an alicyclic structure-containing polymer becomes poor. It is hence not preferable to contain such a repeating unit in a too low proportion. No particular limitation is imposed on other repeating units than the repeating unit having the alicyclic structure in the alicyclic structure-containing polymer, and they are suitably selected as necessary for the end application intended.

As specific examples of alicyclic structure-containing polymer resins, may be mentioned (1) norbornene polymers, (2) monocyclic cycloolefin polymers, (3) cyclic conjugated diene polymers, (4) vinyl alicyclic hydrocarbon polymers, and hydrogenated products thereof. Among these, the norbornene polymers and hydrogenated products thereof, and the cyclic conjugated diene polymers and hydrogenated products thereof are preferred, with the norbornene polymers and hydrogenated products thereof being more preferred.

(1) Norbornene Polymer:

The norbornene polymers used in the present invention are publicly known polymers disclosed in, for example, Japanese Patent Application Laid-Open Nos. 3-14882 and 3-122137. More specifically, examples of the norbornene polymers include ring-opening polymers of norbornene monomers and hydrogenated products thereof, addition polymers of norbornene monomers, and addition copolymers of a norbornene monomer with another copolymerizable monomer. Among these, the ring-opening polymers of the norbornene monomers and hydrogenated products thereof are preferred from the viewpoint of balancing heat resistance and chemical resistance with each other at a high level, with the hydrogenated products of the ring-opening polymers of the norbornene monomers being particularly preferred.

Examples of the norbornene monomers include bicyclo[2.2.1]hept-2-ene (trivial name: norbornene), 5-methyl-bicyclo[ 2.2.1]hept-2-ene, 5,5-dimethyl-bicyclo-[ 2.2.1]hept-2-ene, 5-ethyl-bicyclo[ 2.2.1]hept-2-ene, 5-butyl-bicyclo[2.2.1]hept-2-ene, 5-hexyl-bicyclo[2.2.1]hept-2-ene, 5-octyl-bicyclo[ 2.2.1]hept-2-ene, 5-octadecyl-bicyclo[2.2.1]hept-2-ene, 5-ethylidene-bicyclo[2.2.1]hept-2-ene, 5-methylidene-bicyclo[2.2.1]hept-2-ene, 5-vinyl-bicyclo[2.2.1]hept-2-ene, 5-propenyl-bicyclo[2.2.1]hept-2-ene, 5-methoxycarbonyl-bicyclo[2.2.1]hept-2-ene, 5-cyano-bicyclo[ 2.2.1]hept-2-ene, 5-methyl-5-methoxycarbonyl-bicyclo[ 2.2.1]hept-2-ene, 5-methoxycarbonyl-bicyclo-[ 2.2.1]hept-2-ene, 5-ethoxycarbonyl-bicyclo[2.2.1]hept-2-ene, 5-methyl-5-ethoxycarbonyl-bicyclo[2.2.1]hept-2-ene, bicyclo[2.2.1]hept-5-enyl-2-methylpropionate, bicyclo-[ 2.2.1]hept-5-enyl-2-methyloctanoate, bicyclo[2.2.1]hept-2-ene-5,6-dicarboxylic acid anhydride, 5-hydroxymethyl-bicyclo[2.2.1]hept-2-ene, 5,6-di-(hydroxymethyl)-bicyclo-[ 2.2.1]hept-2-ene, 5-hydroxyisopropyl-bicyclo[2.2.1]hept-2-ene, bicyclo[2.2.1]hept-2-ene, 5,6-dicarboxy-bicyclo[ 2.2.1]hept-2-ene, bicyclo[2.2.1]hept-2-ene-5,6-dicarboxylic acid imide, 5-cyclopentyl-bicyclo[2.2.1]hept-2-ene, 5-cyclohexyl-bicyclo[2.2.1]hept-2-ene, 5-cyclohexenyl-bicyclo[ 2.2.1]hept-2-ene, 5-phenyl-bicyclo[ 2.2.1]hept-2-ene, tricyclo[4.3.1$^{2,5}$.0$^{1,6}$]undec-3,7-diene (trivial name: dicyclopentadiene), tricyclo[4.3.1$^{2,5}$.0$^{1,6}$]dec-3-ene, tricyclo[4.4.1$^{2,5}$.0$^{1,6}$]undec-3,7-diene, tricyclo[4.4.1$^{2,5}$.0$^{1,6}$]undec-3,8-diene, tricyclo[4.4.1$^{2,5}$.0$^{1,6}$]undec-3-ene, tetracyclo-[7.4.1$^{10,13}$.0$^{1,9}$.0$^{2,7}$]tridec-2,4,6,11-tetraene (also referred to as 1,4-methano-1,4,4a,9a-tetrahydrofluorene), tetracyclo [8.4.1$^{11,14}$.0$^{1,10}$.0$^{3,8}$] tetradec-3,5,7,12-11-tetraene (also referred to as 1,4-methano-1,4,4a,5,10,10a-hexahydro-anthracene), tetracyclo[4.4.1$^{2,5}$.1$^{7,10}$.0]dodec-3-ene (trivial name: tetracyclododecene), 8-methyl-tetracyclo-[ 4.4.1$^{2,5}$.1$^{7,10}$.0]dodec-3-ene, 8-methyl-tetracyclo-[ 4.4.1$^{2,5}$.1$^{7,10}$.0]dodec-3-ene, 8-ethyl-tetracyclo-[ 4.4.1$^{2,5}$.1$^{7,10}$.0]dodec-3-ene, 8-methylidene-tetracyclo-[ 4.4.1$^{2,5}$.1$^{7,10}$. 0]dodec-3-ene, 8-ethylidenetetracyclo-[ 4.4.1$^{2,5}$.1$^{7,10}$.0]dodec-3-ene, 8-vinyl-tetracyclo-[ 4.4.1$^{2,5}$.1$^{7,10}$.0]dodec-3-ene, 8-propenyl-tetracyclo-[ 4.4.1$^{2,5}$.1$^{7,10}$.0]dodec-3-ene, 8-methoxycarboxy-tetracyclo-[ 4.4.1$^{2,5}$.1$^{7,10}$.0]dodec-3-ene, 8-methyl-8-methoxycarbonyl-tetracyclo[ 4.4.1$^{2,5}$.1$^{7,10}$.0]dodec-3-ene, 8-hydroxymethyl-tetracyclo[ 4.4.1$^{2,5}$.1$^{7,10}$.0]dodec-3-ene, 8-carboxy-tetracyclo[ 4.4.1$^{2,5}$.1$^{7,10}$.0]dodec-3-ene, 8-cyclopentyl-tetracyclo[ 4.4.1$^{2,5}$.1$^{7,10}$.0]dodec-3-ene, 8-cyclohexyl-tetracyclo[ 4.4.1$^{2,5}$.1$^{7,10}$.0]dodec-3-ene, 8-cyclohexenyl-tetracyclo[ 4.4.1$^{2,5}$.1$^{7,10}$.0]dodec-3-ene, 8-phenyl-tetracyclo[ 4.4.1$^{2,5}$.1$^{7,10}$.0]dodec-3-ene, pentacyclo-[6.5.1$^{1,8}$.1$^{3,6}$.0$^{2,7}$.0$^{9,13}$]pentadec-3,10-diene and pentacyclo [7.4.1$^{3,6}$.1$^{10,13}$.0$^{1,9}$.0$^{2,7}$]pentadec-4,11-diene.

These norbornene monomers may be used either singly or in any combination thereof. Among the norbornene monomers, tetracyclododecenes, dicyclopentadienes and combinations thereof are particularly preferred from the viewpoints of heat resistance, low water absorption property, transparency, moldability, etc.

The ring-opening polymers of these norbornene monomers can be obtained by subjecting at least one norbornene monomer to ring-opening polymerization in the presence of a ring-opening polymerization catalyst. As the ring-opening polymerization catalyst, may be used a catalyst system composed of a halide, nitrate or acetylacetone compound of a metal such as ruthenium, rhodium, palladium, osmium, iridium or platinum, and a reducing agent, or a catalyst system composed of a halide or acetylacetone compound of a metal such as titanium, vanadium, zirconium, tungsten or molybdenum, and an organoaluminum compound. The polymerization reaction is conducted at a polymerization temperature of generally −50° C. to 100° C. under polymerization pressure of generally 0 to 50 kg/cm$^2$ in a solvent or without using any solvent.

The hydrogenated product of the ring-opening polymer of the norbornene monomer can be generally obtained by adding a hydrogenation catalyst to a solution of the ring-opening polymer of the norbornene monomer to hydrogenate the norbornene polymer with molecular hydrogen. No particular limitation is imposed on the hydrogenation catalyst. However, a heterogeneous catalyst or homogeneous catalyst is generally used.

The addition (co)polymer of the norbornene monomer(s), or the norbornene monomer with another monomer copolymerizable with the norbornene monomers can be obtained in accordance with, for example, a process comprising (co)polymerizing the monomer component(s) at a polymerization temperature of generally −50° C. to 100° C. under polymerization pressure of generally 0 to 50 kg/cm$^2$ in a solvent or without using any solvent in the presence of a catalyst system composed of a titanium, zirconium or vanadium compound and an organoaluminum compound.

Examples of other copolymerizable monomers used include a-olefins having 2 to 20 carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene; cycloolefins such as cyclobutene, cyclopentene, cyclohexene, 3,4-dimethylcyclopentene, 3-methylcyclohexene, 2-(2-methyl-butyl)-1-cyclohexene, cyclooctene and 3a,5,6,7a-tetrahydro-4,7-methano-1H-indene; and non-conjugated dienes such as 1,4-hexadiene, 4-methyl-1,4-hexadiene, 5-methyl-1,4-hexadiene and 1,7-octadiene. Among these, the α-olefins are preferred, with ethylene being particularly preferred.

These other copolymerizable monomers may be used either singly or in any combination thereof. When a norbornene monomer and another copolymerizable monomer are subjected to addition copolymerization, these monomers are suitably selected in such a manner that a proportion of the bound unit derived from the norbornene monomer to the bound unit derived from another copolymerizable monomer in the resulting addition copolymer is generally 30:70 to 99:1, preferably 50:50 to 97:3, more preferably 70:30 to 95:5 in terms of a weight ratio.

(2) Monocyclic Cycloolefin Polymer:

As the monocyclic cycloolefin polymer, may be used, for example, an addition polymer of a monocyclic cycloolefin monomer such as cyclohexene, cycloheptene or cyclooctene, which is disclosed in Japanese Patent Application Laid-Open No. 64-66216.

(3) Cyclic Conjugated Diene Polymer:

As the cyclic conjugated diene polymer, may be used, for example, a polymer obtained by subjecting a cyclic conjugated diene monomer such as cyclopentadiene or cyclohexadiene to 1,2- or 1,4-addition polymerization, or a hydrogenated product thereof, which is disclosed in Japanese Patent Application Laid-Open No. 6-136057 or 7-258318.

(4) Vinyl Alicyclic Hydrocarbon Polymer:

As the vinyl alicyclic hydrocarbon polymer, may be used, for example, a polymer of a vinyl cyclic hydrocarbon monomer such as vinylcyclohexene or vinylcyclohexane, or a hydrogenated product thereof, which is disclosed in Japanese Patent Application Laid-Open No. 51-59989, or a product obtained by hydrogenating the aromatic ring portion of a polymer of a vinyl aromatic monomer such as styrene or a-methylstyrene, which is disclosed in Japanese Patent Application Laid-Open No. 63-43910 or 64-1706.

The molecular weight of the alicyclic structure-containing resin used in the present invention is suitably selected as necessary for the end application intended, but is within a range of generally 5,000 to 500,000, preferably 8,000 to 200,000, more preferably 10,000 to 100,000 when expressed by a weight average molecular weight in terms of polyisoprene or polystyrene as determined in the form of a cyclohexane solution (a toluene solution when the polymer is not dissolved in cyclohexane) by gel permeation chromatography. When the weight average molecular weight falls within the above range, the mechanical strength and the forming and processing ability of the resulting molding are balanced with each other at a high level, and so such a polymer is preferred.

The glass transition temperature (Tg) of the alicyclic structure-containing resin used in the present invention may be suitably selected as necessary for the end application intended. However, it is within a range of generally at least 80° C., preferably 100 to 250° C., more preferably 120 to 200° C. When Tg falls within this range, the heat resistance and molding and processing ability of the polymer are balanced with each other at a high level, and so such a polymer is preferred.

The melt flow rate of the alicyclic structure-containing resin used in the present invention as measured at 280° C. under a load of 2.16 kgf in accordance with JIS K 6719 may be suitably selected as necessary for the end application intended. However, it is preferably within a range of generally 0.1 to 100 g/10 min, preferably 1 to 50 g/min. When the melt flow rate falls within this range, the surface precision, dimensional stability and mechanical strength of the resulting molding are balanced with one another at a high level, and so such a polymer is preferred.

In the present invention, into the alicyclic structure-containing polymers, as needed, may be incorporated stabilizers such as antioxidants, ultraviolet absorbents, light stabilizers and heat stabilizers; fillers such as organic fillers and inorganic fillers; colorants such as dyes and pigments; and additives such as near infrared absorbents, plasticizers, lubricants, antistatic agents, flame retardants, other resins than the alicyclic structure-containing polymers and soft polymers. These additives may be used either singly or in any combination thereof. The amount of the additives added is suitably selected within limits not impeding the objects of the present invention.

The forms of the moldings according to the present invention are not limited, and examples thereof include moldings in the forms of a plate, disk, sheet, film, cylinder, convex lens, concave lens, container and the like. No particular limitation is imposed on the molding or forming method. For example, methods such as injection molding, direct blow molding, injection blow molding and extrusion are used.

These moldings are suitable for use in light guides for back light in LCD, containers such as food containers and drug containers, measuring instruments such as cylinders and measuring cups, sheet-like lenses such as lenticular lenses and Fresnel lenses, etc.

EXAMPLES

The present invention will hereinafter be described more specifically by the following Preparation Examples, Examples and Comparative Examples. However, the present invention is not limited to these examples.

All designations of "part" or "parts" as will be used in these examples mean part or parts by weight unless expressly noted. Various physical properties were determined in accordance with the following methods:

(1) The glass transition temperature (Tg) was measured by means of a differential scanning calorimeter (DSC method).

(2) The molecular weight was determined in terms of polyisoprene as measured by gel permeation chromatography (GPC) using cyclohexane as a solvent unless expressly noted.

(3) The determination of adhesion strength (retention) of a pattern formed with an ink and evaluation after a durability test were conducted in accordance with the following respective methods.

① In Case of Light Guide:

The same pressure sensitive adhesive tape as that used in the cross-cut adhesion test prescribed in JIS K 5400 was struck on an arbitrary 10-mm² square area of a pattern of circular dots having a diameter of 0.4 to 0.7 mm formed on the surface of a molding sample (light guide) in accordance with a method, which will be described subsequently, in such a manner that the diameter gradually increases as it becomes more distant from the plane of incidence (on the side of a light source) at an end, and the pressure sensitive adhesive tape was peeled in the same manner as in the cross-cut adhesion test to find a retention of the pattern [(number of remaining dots/total number of dots in the area)×100[%]].

After the retention of the pattern was determined by the above-described method, this light guide was used to fabricate a back light unit to measure an average luminance and luminance mottling right after the assembly of the back light unit and after the unit was left to stand for 500 hours under high-temperature and high-humidity environment of 60° C. and 90% relative humidity.

Upon the measurement of the luminance and luminance mottling, the light emitting area was divided into 9 portions (divided into 3 portions in horizontal and vertical directions) after assembling the back light unit using the light guide. The luminance was measured at a position vertically upward 60 cm away from the central point of each divided portion by means of a colorimetric luminance meter (BM-7, manufactured by Topukon K. K). An average of values at the 9 positions was regarded as the average luminance, and a deviation (%) of the maximum luminance and minimum luminance to the average luminance was regarded as the luminance mottling.

② In Case of Container:

A 10-mm² square pattern with gradation composed of an aggregate of dots 0.1 to 0.3 mm in diameter was formed on a molding sample (a dish 140 mm in diameter and 40 mm in depth) by pad printing with a black ink. This sample was tested in the same manner as in the light guide to find a retention of the pattern [(area of the remaining ink layer/the whole area in the area)×100[%]].

After the black pattern was formed on the container to determine the retention of the pattern, the container was disinfected for 30 minutes by boiling water of 100° C. and then left to stand for 5 minutes, thereby evaluating it as to appearance changes (discoloration, wrinkling, blistering, etc.) of the pattern.

(4) The index of wetting of an ink layer in each molding sample was determined by coating the whole surface of the molding with the same printing ink as that actually used, and conducting measurement on the resultant coating film in accordance with the method described in JIS K 6768.

Preparation Example 1

Fifteen parts of 8-ethyltetracyclo-[ 4.4.1$^{2,5}$.1$^{7,10}$.0]dodec-3-ene (hereinafter abbreviated as "ETD") and 85 parts of tricyclo[4.3.1$^{2,5}$.0 $^{1,6}$]dec-3,7-diene (i.e., dicyclopentadiene; hereinafter referred to as "DCP") were dissolved in 250 parts of dehydrated cyclohexane, and 1.8 parts of 1-hexene were added as a molecular weight modifier to the solution. ETD and DCP were subjected to ring-opening polymerization using a publicly known metathesis catalyst, and the resultant copolymer was then hydrogenated in accordance with a method known per se in the art to obtain a hydrogenated ring-opening ETD/DCP copolymer. A copolymerization ratio between the respective norbornenes in the polymer was calculated from the composition (determined by gas chromatography) of the norbornenes remaining in the solution after the polymerization. As a result, ETD/DCP was 15/85 and almost equal to the charged composition. The hydrogenated ring-opening ETD/DCP copolymer had a weight average molecular weight (Mw) of the was 31,000, a rate of hydrogenation of 99.9% and Tg of 103° C.

To 100 parts of the hydrogenated ring-opening copolymer thus obtained, were added 0.2 parts of an antioxidant (Irganox 1010, product of CIBA-GEIGY AG) and 0.2 parts of a soft polymer (Toughtec H1052, product of Asahi Chemical Industry Co., Ltd.), and the resultant mixture was kneaded and extruded by means of a twine-screw extruder (TEM-35B, manufactured by Toshiba Machine Co., Ltd.; screw diameter: 37 mm; L/D=32, screw revolution speed: 250 rpm; resin temperature: 240° C.; feed rate: 10 kg/hr) to obtain pellets.

Example 1

Molding of Light Guide

After the pellets obtained in Preparation Example 1 were heated at 80° C. for 2 hours to predry them, a 10.4-in light guide was molded by injection molding using an injection molding machine (Product No. IS450, manufactured by Toshiba Machine Co., Ltd.) of a side gate system having a hot runner.

The molding conditions were as follows:
mold temperature: 110° C.,
cylinder temperature: 290° C.,
nozzle temperature: 260° C.,
hot nozzle (hot tip) temperature: 250° C.,
hot runner temperature: 250° C., and
resin temperature: 290° C.

The light guide thus obtained was in the form of a wedge that a thickness of a thick-wall portion on the side of the plane of incidence is 2.5 mm, a thickness of a thin- wall portion on the opposite side is 1.5 mm, a length from the side of the thick-wall portion to the side of the thin-wall portion (length in the longitudinal direction of the light guide from a light source) is 190 mm, a length along the axial direction of the linear light source is 280 mm, and the thickness gradually thins as it becomes more distant from the side of the thick-wall portion to the side of the thin-wall portion (in a direction substantially perpendicular to the axis of the linear light source). The schematic sectional view thereof is illustrated in FIG. 1.

A pattern composed of a plurality of white circular dots that the diameter of each dot gradually increases from the side of the thick-wall portion to the side of the thin-wall portion was printed on one surface of the light guide thus obtained by screen printing (size of the circular dot: 0.4 to 0.7 mm in diameter; interval between the central points of the dots: 0.8 mm). As a printing ink, was used a printing ink (OP-22; product of Seiko Advance K.K.) containing an olefin resin as a main component. After the white ink and a medium (colorless ink for adjusting color density) were mixed at a weight ratio of 1:1, the mixture was adjusted to a solids concentration of 10% by weight with a diluent solvent (T-900; product of Seiko Advance K.K.) before use.

The adhesion strength of the dot pattern was measured 5 times in accordance with the tape peeling adhesion test described above. As a result, the retentions were all 100%. The index of wetting of the ink layer was 31 dyn/cm.

The light guide, on which the above pattern had been printed, was used to fabricate a back light unit in accordance with a process described below to measure an average luminance and luminance mottling at an initial stage and after the high-temperature and high-humidity test (left to stand for 500 hours at a temperature of 60° C. and a relative humidity of 90%).

The unit was fabricated by using a cold cathode tube as a light source and a reflector for light source, installing a reflecting sheet on the surface on which the dot pattern had been formed and arranging a light-diffusing sheet on the opposite surface (outgoing surface of light).

The results are shown in Table 1.

Example 2

A light guide, on which a pattern had been printed, was produced in the same manner as in Example 1 except that an ink (SG-740; product of Seiko Advance K.K.) containing a urethane resin as a main component was used as a printing ink, and a corona discharge treatment was conducted on the surface of the light guide before the printing of the pattern.

With respect to the adhesion strength of the pattern, the retention was 100% in all the 5 runs. The index of wetting of the ink layer was 38 dyn/cm. A back light unit was fabricated and evaluated. The results are shown in Table 1.

Example 3

A light guide, on which a pattern had been printed, was produced in the same manner as in Example 2 except that no corona discharge treatment was conducted on the surface of the light guide.

With respect to the adhesion strength of the pattern, the retention was 85% in terms of an average value of the 5 runs. The index of wetting of the ink layer was 38 dyn/cm. A back light unit was fabricated and evaluated. The results are shown in Table 1.

Example 4

A light guide, on which a pattern had been printed, was produced in the same manner as in Example 1 except that an ink (trade name: 2500; product of Seiko Advance K.K.) was used as a printing ink, and a corona discharge treatment was conducted on the surface of the light guide before the printing of the pattern.

With respect to the adhesion strength of the pattern, the retention was 85% in terms of an average value of the 5 runs. The index of wetting of the ink layer was 41 dyn/cm. A back light unit was fabricated and evaluated. The results are shown in Table 1.

Comparative Example 1

A light guide, on which a pattern had been printed, was produced in the same manner as in Example 1 except that an ink (trade name: HIP; product of Seiko Advance K.K.) was used as a printing ink, and a corona discharge treatment was conducted on the surface of the light guide before the printing of the pattern.

With respect to the adhesion strength of the pattern, the retention was lower than 80% in all the 5 runs. The index of wetting of the ink layer was 45 dyn/cm. A back light unit was fabricated and evaluated. The results are shown in Table 1.

TABLE 1

| | Kind of ink | Index of wetting (dyn/cm) | Corona discharge treatment | Retention of pattern (%) | Average luminance ($cd/m^2$) | | Luminance mottling (%) | |
|---|---|---|---|---|---|---|---|---|
| | | | | | Before test | After test | Before test | After test |
| Ex. 1 | OP-22, product of Seiko Advance K.K. | 31 | Not treated | 100 | 1420 | 1380 | ≦±10 | ≦±10 |
| Ex. 2 | SG-740, product of Seiko Advance K.K. | 38 | Treated | 100 | 1380 | 1340 | ≦±10 | ≦±10 |
| Ex. 3 | SG-740, product of Seiko Advance K.K. | 38 | Not treated | 85 | 1170 | 1012 | ±10–20 | ±20≦ |
| Ex. 4 | 2500, product of Seiko Advance K.K. | 41 | Treated | 85 | 1150 | 980 | ±10–20 | ±20≦ |
| Comp. Ex. 1 | HIP, product of Seiko Advance K.K. | 45 | Treated | Lower than 80 | 810 | Immeasurable | ±20≦ | Immeasurable |

From the results of Examples 1 to 3 and Comparative Example 1, it was confirmed that the light guides according to the present invention are excellent in adhesion of the reflection pattern and hence cause neither lowering of luminance nor increase of luminance mottling.

Example 5

Molding of Container

The pellets obtained in Preparation Example 1 were used to injection-mold a circular dish type container that a diameter of an opening part was 120 mm, a diameter of a bottom part was 75 mm, a depth was 35 mm, and a thickness was 2.4 mm under conditions of a cylinder temperature of 300° C., a mold temperature of 140° C., an injection speed of 45 $cm^3$/sec, an injection pressure of 1,000 $kg/cm^2$, a dwell pressure of 800 $kgf/cm^2$ and a back pressure of 70 $kgf/cm^2$.

A black pattern with gradation was formed on the bottom part of the container thus obtained by pad printing. As a printing ink, an ink (5600 OPS, product of Jujo Chemical Co., Ltd.) containing cyclized rubber as a main component was used and adjusted to a solids concentration of 20% by weight with a diluent solvent for ink before use.

The container, on which the black pattern had been printed, was used to measure the adhesion strength of the pattern. As a result, the retention was 100% in all the 5 runs. The index of wetting of the ink layer was 31 dyn/cm. This container was used to observe appearance changes of the pattern after a boiling test (at 100° C. for 30 minutes). As a result, none of discoloration, wrinkling, blistering, etc. were observed. The results are shown in Table 2.

Example 6

A container was produced in the same manner as in Example 3 except that an ink (trade name: 2000 AP, product of Jujo Chemical Co., Ltd.) was used as the printing ink, and evaluated. As a result, the adhesion strength of the pattern at an initial stage was 88% in terms of an average value of the retentions in 5 runs. The index of wetting of the ink layer was 42 dyn/cm. The results are shown in Table 2.

Comparative Example 2

A container was produced in the same manner as in Example 3 except that an ink (trade name: 900 Tetoron, product of Jujo Chemical Co., Ltd.) was used as the printing ink, and evaluated. As a result, the adhesion strength of the pattern at an initial stage was lower than 80% in all the 5 runs. The index of wetting of the ink layer was 46 dyn/cm. The results are shown in Table 2.

TABLE 2

| | Kind of ink | Index of wetting (dyn/cm) | Retention of pattern (%) | Appearance Before boiling | Appearance After boiling |
|---|---|---|---|---|---|
| Ex. 5 | 5600 OPS, product of Jujo Chemical Co., Ltd. | 31 | 100 | Not changed | Not changed |
| Ex. 6 | 2000 AP, product of Jujo Chemical Co., Ltd. | 42 | 88 | Not changed | Not changed |
| Comp. Ex. 2 | 900 Tetoron, product of Jujo Chemical Co.. Ltd. | 46 | Lower than 80 | Not changed | Caused discoloration, wrinkling and blistering |

From the results of Examples 4 and 5 and Comparative Example 2, it was confirmed that the containers having the black pattern satisfying the retention of the ink layer of at least 80% did not caused appearance defects such as discoloration, wrinkling and blistering after disinfected by boiling, while the container of Comparative Example 2 that the retention was lower than 89% caused discoloration, wrinkling and blistering on the pattern in contrast to the container of the Examples.

INDUSTRIAL APPLICABILITY

According to the present invention, there are provided moldings formed from an alicyclic structure-containing polymer and provided with a patterned ink layer on the surfaces thereof, wherein the molding is excellent in adhesion to the ink layer and hard to cause interfacial separation, deformation, discoloration, etc. of the ink layer even when they are left to stand for a long period of time under high-temperature and high-humidity environment.

According to the present invention, there are provided moldings formed from an alicyclic structure-containing polymer and provided with a patterned ink layer on the surfaces thereof, wherein in a long-time high-temperature and high-humidity test, the patterned ink layer (1) undergoes none of appearance defects such as color fading, wrinkling and blistering and (2) causes no deterioration of optical properties (for example, light reflectance) due to penetration of air and water into the interface by separation of the patterned ink layer.

More specifically, when the molding according to the present invention is used as, for example, a light guide having a reflection pattern, neither lowering of luminance nor increase of luminance mottling occurs in the high-temperature and high-humidity test. Besides, the molding according to the present invention is used as a container with a design or the like, none of appearance defects of the pattern formed, such as discoloration, wrinkling and blistering, occur in the boiling test.

What is claimed is:

1. A molding having an ink layer, wherein the molding is formed from an alicyclic structure-containing polymer, the ink layer is provided after a pattern on the surface of the molding, and the retention of the ink layer when a 1-cm$^2$ portion arbitrarily selected from the surface of the molding containing the patterned ink layer is subjected to a tape peeling adhesion test is at least 80%.

2. The molding according to claim 1, wherein the patterned ink layer is made up by dots or lines by an ink, or a combination thereof.

3. The molding according to claim 1, wherein the index of wetting of the ink layer is at most 42 dyn/cm.

4. The molding according to claim 1, wherein the thickness of the ink layer is at most 100 µm.

5. The molding according to claim 1, wherein the ink layer is provided by an ink containing at least one polymer component selected from the group consisting of an olefin resin, acrylic resin, urethane resin, epoxy resin and cyclized rubber.

6. The molding according to claim 1, wherein the patterned ink layer has a light-reflecting function.

7. The molding according to claim 6, which is a light guide for back light in a liquid crystal display device.

8. The molding according to claim 1, which is a container.

9. The molding according to claim 1, wherein the alicyclic structure-containing polymer is a norbornene polymer.

10. The molding according to claim 9, wherein the norbornene polymer is a hydrogenated ring-opening polymer of a norbornene monomer.

11. The molding according to claim 10, wherein the norbornene polymer is a hydrogenated ring-opening polymer of a norbornene monomer composed of a tetracyclododecene, a dicyclopentadiene or a combination thereof.

12. A molding having an ink layer, wherein the molding is formed from an alicyclic structure-containing polymer, and the ink layer is provided after a pattern on the surface of the molding and has an index of wetting of at most 42 dyn/cm.

* * * * *